United States Patent Office 2,736,734
Patented Feb. 28, 1956

2,736,734

$\Delta^{1,4}$-3,20-DIKETO-11-OXYGENATED-17,21-DIHYDROXY-PREGNADIENE 21-TERTIARY BUTYL ACETATES AND 9-FLUORO DERIVATIVES THEREOF

Lewis H. Sarett, Princeton, N. J., assignor to Merck & Co., Inc., Rahway, N. J., a corporation of New Jersey No Drawing. Application January 14, 1955,
Serial No. 481,956

11 Claims. (Cl. 260—397.45)

This invention is concerned generally with novel steroid esters and processes of preparing the same. More particularly, it relates to novel esters of tertiary butyl-acetic acid with $\Delta^{1,4}$-3,11,20-triketo-17$\alpha$,21-dihydroxy-pregnadiene and closely related compounds which are especially adapted for the treatment of rheumatoid or osteoarthritic joints, and pharmaceutical compositions containing these esters. The novel $\Delta^{1,4}$-3,11,20-triketo-17$\alpha$,21-dihydroxy-pregnadiene tertiary butyl-acetylate and closely related compounds possess cortisone-activity, but differ from cortisone and hydrocortisone in not possessing sodium or water retention action. When administered intraarticularly, they have prolonged effectiveness as compared with cortisone derivatives commonly used for such administration.

The novel $\Delta^{1,4}$-3,20-diketo-11-oxygenated-17,21-dihydroxy-pregnadiene tertiary butyl-acetate compounds, subject of the present invention, may be chemically represented as follows:

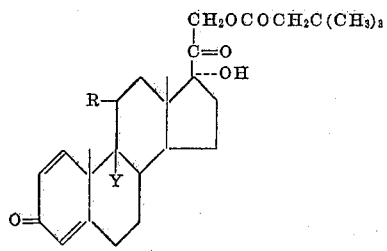

wherein R is a keto or hydroxy radical, and Y is a hydrogen or halogen substituent.

These novel $\Delta^{1,4}$-3,20-diketo-11-oxygenated-17,20-dihydroxy-pregnadiene 21-tertiary butyl-acetate compounds may be prepared by reacting tertiary butyl-acetyl chloride with the corresponding $\Delta^{1,4}$-3,20-diketo-11-oxygenated-17,21-dihydroxy-pregnadiene compound containing a free 21-alcohol grouping in the presence of a base. This is conveniently accomplished by adding tertiary butyl-acetyl chloride to a cold solution of the $\Delta^{1,4}$-3,20-diketo-11-oxygenated-17,21-dihydroxy-pregnadiene free alcohol compound in a mixture of chloroform and pyridine, allowing the mixture to stand in the cold until the conversion of $\Delta^{1,4}$-3,20-diketo-11-oxygenated-17,21-dihydroxy-pregnadiene free alcohol compound to the ester is complete, adding water to the resulting reaction mixture and extracting the product from the mixture thus obtained with chloroform. After evaporation of the chloroform solution under diminished pressure, the $\Delta^{1,4}$-3,20-diketo-11-oxygenated-17,21-dihydroxy-pregnadiene 21-tertiary butyl-acetate compound is obtained in the form of an oil, which crystallizes from ethanol, and which can be further purified by recrystallization from that solution.

The $\Delta^{1,4}$-3,20-diketo-11-oxygenated-17,21-dihydroxy-pregnadiene compounds having a free 21-alcohol grouping which are ordinarily employed as starting materials in the hereinabove-mentioned procedure include $\Delta^{1,4}$-3,11,20-triketo-17$\alpha$,21-dihydroxy-pregnadiene, $\Delta^{1,4}$-3,20-diketo-11$\beta$,17$\alpha$,21-trihydroxy-pregnadiene, 9-halo-$\Delta^{1,4}$-3,20-diketo-11-oxygenated-17,21-dihydroxy-pregnadiene compounds such as $\Delta^{1,4}$-9$\alpha$-chloro-3,11,20-triketo-17$\alpha$,21-dihydroxy-pregnadiene, $\Delta^{1,4}$-9$\alpha$-fluoro-3,11,20-triketo-17$\alpha$,21-dihydroxy-pregnadiene, $\Delta^{1,4}$-9$\alpha$-chloro-3,20-diketo-11$\beta$,17$\alpha$,21-trihydroxy-pregnadiene, $\Delta^{1,4}$-9$\alpha$-fluoro-3,20-diketo-11$\beta$,17$\alpha$,21-trihydroxy-pregnadiene, and the like. When these starting materials are reacted with tertiary butyl-acetyl chloride in the presence of a base, there are obtained $\Delta^{1,4}$-3,11,20-triketo-17$\alpha$,21-dihydroxy-pregnadiene 21-tertiary butyl-acetate, $\Delta^{1,4}$-3,20-diketo-11$\beta$,17$\alpha$,21-trihydroxy-pregnadiene 21-tertiary butyl-acetate, 9-halo-$\Delta^{1,4}$-3,11,20-triketo-17$\alpha$,21-hydroxy-pregnadiene 21-tertiary butyl-acetate, $\Delta^{1,4}$-9$\alpha$-chloro-3,11,20-triketo-17$\alpha$,21-dihydroxy-pregnadiene 21-tertiary butyl-acetate, $\Delta^{1,4}$-9$\alpha$-fluoro-3,11,20-triketo-17$\alpha$,21-dihydroxy-pregnadiene 21-tertiary butyl-acetate, 9-halo-$\Delta^{1,4}$-3,20-diketo-11$\beta$,17$\alpha$,21-trihydroxy-pregnadiene 21-tertiary butyl-acetate, $\Delta^{1,4}$-9$\alpha$-chloro-3,20-diketo-11$\beta$,17$\alpha$,21-trihydroxy pregnadiene 21-tertiary butyl-acetate, $\Delta^{1,4}$-9-fluoro-3,20-diketo-11$\beta$,17$\alpha$,21-trihydroxy-pregnadiene 21-tertiary butyl-acetate, and the like.

A further embodiment of this invention comprises novel pharmaceutical compositions containing these $\Delta^{1,4}$-3,20-diketo-11-oxygenated-17,21-dihydroxy-pregnadiene 21-tertiary butyl-acetate compounds. It is ordinarily preferred to utilize compositions comprising suspensions of $\Delta^{1,4}$-3,20-diketo-11-oxygenated-17,21-dihydroxy-pregnadiene 21-tertiary butyl-acetate compounds in suitable pharmaceutical vehicles containing surfactants, suspending agents, etc. and which may, if desired, contain other esters of $\Delta^{1,4}$-3,11,20-triketo-17$\alpha$,21-dihydroxy-pregnadiene and related compounds in addition to the tertiary butyl-acetate ester. Such suspensions act promptly in relieving the inflamed condition of rheumatic joints and provide a prolonged relief of the symptoms.

The following examples illustrate methods of carrying out the present invention but it is to be understood that these examples are given for purposes of illustration and not of limitation.

Example 1

A solution of about twenty parts of tertiary butyl-acetyl chloride in 85 parts of dry chloroform is added portion-wise to a cold solution of 50 parts of $\Delta^{1,4}$-3,11,20-triketo-17$\alpha$,21-dihydroxy-pregnadiene in 250 parts of anhydrous pyridine. The resulting solution is allowed to stand for about 15 hours at 0–5° C., and the reaction solution is poured into 1500 parts of water. The resulting aqueous mixture is extracted with four portions of chloroform each containing approximately 500 parts. The combined chloroform layers are washed with water, dilute aqueous hydrochloric acid solution, water, 5% aqueous sodium bicarbonate solution, and finally with water. The chloroform extract is dried over magnesium sulfate, and the chloroform is evaporated in vacuo to give a residual oil. This oil is triturated with alcohol until it crystallizes, and is then recrystallized from ethanol to give substantially pure $\Delta^{1,4}$-3,11,20-triketo-17$\alpha$,21-dihydroxy-pregnadiene 21-tertiary butyl-acetate.

The tertiary butyl-acetyl chloride employed in the foregoing procedure is prepared by adding tertiary butyl-acetic acid portion-wise to thionyl chloride with cooling. The resulting mixture is heated for a period of about 90 minutes on a steam bath, and is then distilled in vacuo to give tertiary butyl-acetyl chloride.

The $\Delta^{1,4}$-3,11,20-triketo-17$\alpha$,21-dihydroxy-pregnadiene utilized as starting material in the foregoing example can be prepared as follows: a solution containing 39.6 g. of bromine in 300 cc. of acetic acid is added to a solution containing 100 g. of 3,11,20-triketo-17$\alpha$-hydroxy-21-acetoxy-pregnane dissolved in 1500 cc. of acetic acid.

When the reaction is substantially complete, the solution is immediately poured into water, and the resulting suspension is extracted with chloroform. The chloroform extract is washed with water, evaporated to dryness, and the residual material crystallized from acetone-ether to give as a substantially pure crystalline product the 4-bromo-3,11,20-triketo-17α-hydroxy-21-acetoxy-pregnane.

The mother liquor from this crystallization procedure is dissolved in benzene and chromatographed over acid-washed alumina, and the chromatogram eluted with mixtures of ether and chloroform. The eluate is evaporated to dryness, and the residual crystalline material is recrystallized from ethyl acetate to give 2-bromo-3,11,20-triketo-17α-hydroxy-21-acetoxy-pregnane. A solution of 300 mg. of this 2-bromo-,311,20-triketo-17α-hydroxy-21-acetoxy-pregnane in 5 ml. of collidine is heated for one hour under reflux, and the collidine is evaporated in vacuo. The residual material is dissolved in chloroform, and the chloroform extract is washed with dilute aqueous hydrochloric acid, then with water, dried and evaporated in vacuo to dryness. The residual material is recrystallized from ethyl acetate to give substantially pure $\Delta^1$-3,11,20-triketo-17α-hydroxy-21-acetoxy-pregnene; M. P. 244–246° C.

Four hundred milligrams of $\Delta^1$-3,11,20-triketo-17α-hydroxy-21-acetoxy-pregnene is dissolved in 50 cc. of glacial acetic acid containing three drops of 30% hydrobromic acid in glacial acetic acid, and to the stirred solution is added a solution containing 0.061 ml. bromide (190 mg.) in 5 ml. of glacial acetic acid over a ten minute period. Five minutes after the addition of bromine is completed, the reaction mixture is poured into 400 ml. of ice water, and the aqueous mixture is extracted three times with chloroform. The chloroform extracts are combined, washed with aqueous sodium bicarbonate solution, then with water, dried and evaporated to dryness in vacuo to give $\Delta^1$-4-bromo-3,11,20-triketo-17α-hydroxy-21-acetoxy-pregnene.

Five hundred milligrams of $\Delta^1$-4-bromo-3,11,20-triketo-17α-hydroxy-21-acetoxy-pregnene is heated under reflux with 10 ml. of collidine for one hour; the reaction mixture is cooled and, with stirring, is treated with 35 ml. of a 2 N aqueous solution of sulfuric acid. The aqueous mixture is extracted three times with chloroform, and the combined chloroform extracts are dried and the chloroform evaporated therefrom in vacuo. The residual material is dissolved in benzene and chromatographed over 15 g. of acid-washed alumina. The chromatogram is eluted with mixtures of ether and chloroform, and the combined eluates are evaporated to dryness. The residual crystalline material is recrystallized from ethyl acetate to give substantially pure $\Delta^{1,4}$-3,11,20-triketo-17α-hydroxy-21-acetoxy-pregnadiene; M. P. 226–228° C.

One hundred milligrams of $\Delta^{1,4}$-3,11,20-triketo-17α,21-dihydroxy-pregnadiene 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure $\Delta^{1,4}$ - 3,11,20 - triketo - 17α,21-dihydroxy-pregnadiene; M. P. 207–214° C.

*Example 2*

A solution of about ten parts of tertiary butyl-acetyl chloride in 45 parts of dry chloroform is added portionwise to a cold solution of 25 parts of $\Delta^{1,4}$-3,20-diketo-11β,17α-21-trihydroxy-pregnadiene in 125 parts of anhydrous pyridine. The resulting solution is allowed to stand for about 15 hours at 0 to 5° C., and the reaction solution is poured into 750 parts of water. The resulting aqueous mixture is extracted four times with 250 parts of chloroform, each extraction. The combined chloroform layers are washed with water, dilute aqueous hydrochloric acid solution, water, 5% aqueous sodium bicarbonate solution, and finally with water. The chloroform extract is dried over magnesium sulfate, and the chloroform is evaporated in vacuo to give a residual oil. This oil is triturated with alcohol until it crystallizes, and is then recrystallized from ethanol to give substantially pure $\Delta^{1,4}$-3,20-diketo-11β,17α,21-trihydroxy - pregnadiene 21-tertiary butyl-acetate.

The $\Delta^{1,4}$-3,20-diketo-11β,17α,21-trihydroxy-pregnadiene employed in the foregoing procedure is prepared, starting with $\Delta^{1,4}$-3,11,20-triketo-17α,21-dihyroxy-pregnadiene, as follows: A mixture of 0.5 part of $\Delta^{1,4}$-3,11,20-triketo-17α,21-dihydroxy-pregnadiene, 0.5 part of anhydrous sodium acetate, 0.62 part of semicarbazide hydrochloride and 35 parts of 95% ethanol is heated at a temperature of about 70° C. for about three hours. The reaction mixture is evaporated to small volume in vacuo, the concentrated solution is diluted with water, and the insoluble material which precipitates is recovered by filtration, washed with water and dried. The resulting material is purified by recrystallization from alcohol to produce substantially pure $\Delta^{1,4}$-3,11,20-triketo-17α,21-dihydroxy-pregnadiene 3,20-bis-semicarbazone. A solution of 0.45 part of $\Delta^{1,4}$-3,11,20-triketo-17α,21-dihydroxy-pregnadiene 3,20-bis-semicarbazone, 0.17 part of sodium borohydride, 9 parts of tetrahydrofuran and 3 parts of water is maintained at reflux temperature for approximately one hour. The reaction solution is cooled to about 15° C., and the excess sodium borohydride decomposed by the addition of a solution of 0.27 part of glacial acetic acid in 1.2 parts of water. The tetrahydrofuran is evaporated in vacuo, and the residual material is extracted with ethyl acetate. The extracts are washed with a saturated salt solution, water, 5% aqueous sodium bicarbonate solution and again with water. The extracts are dried and the ethyl acetate evaporated in vacuo to give $\Delta^{1,4}$ - 3,20-diketo-11β,17α,21-trihydroxy-pregnadiene 3,20-bis-semicarbazone. The $\Delta^{1,4}$-3,20-diketo-11β,17α,21-trihydroxy-pregnadiene 3,20-bis-semicarbazone is mixed with 5 parts of glacial acetic acid, 1.5 parts of water, 0.85 part of sodium acetate, and 0.8 part of 90% pyruvic acid, and the resulting mixture is heated under nitrogen for four hours at about 75° C. The reaction mixture is diluted with 20 parts of water, and the aqueous mixture is evaporated nearly to dryness in vacuo. The residual material is triturated with water and the organic material is extracted with ethyl acetate. The ethyl acetate solution is washed neutral, dried, decolorized, and evaporated to small volume. Upon cooling the resulting concentrate, a crystalline material separates which is recovered by filtration and purified by recrystallization from ethyl acetate to give substantially pure $\Delta^{1,4}$-3,20-diketo-11β,17α,21-trihydroxy-pregnadiene.

*Example 3*

A solution of about four parts of tertiary butyl-acetyl chloride in 17 parts of dry chloroform is added portionwise to a cold solution of 10 parts of $\Delta^{1,4}$-9α-fluoro-3,20-diketo-11β,17α,21-trihydroxy-pregnadiene in 50 parts of anhydrous pyridine. The resulting solution is allowed to stand at 0 to 5° C. for about 15 hours, and the reaction solution is poured into 300 parts of water. The resulting aqueous mixture is extracted with four portions of chloroform each containing approximately 100 parts. The combined chloroform layers are washed with water, dilute aqueous hydrochloric acid solution, water, 5% aqueous sodium bicarbonate solution, and finally with water. The chloroform extract is dried over magnesium sulfate, and the chloroform is evaporated in vacuo to give a residual oil, which is triturated with alcohol until it crystallizes. This material is recrystallized from ethanol to give substantially pure $\Delta^{1,4}$-9α-fluoro-3,20-diketo-11β,17α,21-trihydroxy-pregnadiene 21-tertiary butyl-acetate.

Example 4

A solution of about four parts of tertiary butyl-acetyl chloride in 17 parts of dry chloroform is added portionwise to a cold solution of 10 parts of Δ$^{1,4}$-9α-fluoro-3,11,20-triketo-17α,21-dihydroxy-pregnadiene in 50 parts of anhydrous pyridine. The resulting solution is allowed to stand at 0.25° C. for about 15 hours, and the reaction solution is poured into 300 parts of water. The resulting aqueous mixture is extracted with four portions of chloroform each containing approximately 100 parts. The combined chloroform layers are washed with water, dilute aqueous hydrochloric acid solution, water, 5% aqueous sodium bicarbonate solution, and finally with water. The chloroform extract is dried over magnesium sulfate, and the chloroform is evaporated in vacuo to give a residue which is crystallized from alcohol to give Δ$^{1,4}$-9α-fluoro-3,11,20-triketo-17α,21-dihydroxy-pregnadiene 21-tertiary butyl-acetate.

The Δ$^{1,4}$-9α-fluoro-3,11,20-triketo-17α,21-dihydroxy-pregnadiene and the Δ$^{1,4}$-9α-fluoro-3,20-diketo-11β,17α,21-trihydroxy-pregnadiene used as starting materials in Examples 5 and 6 may be prepared in accordance with the procedures described hereinabove for preparing Δ$^{1,4}$-3,11,20-triketo-17α,21-dihydroxy-pregnadiene and Δ$^{1,4}$-3,20-diketo-11β,17α,21-trihydroxy-pregnadiene but using as starting materials, instead of the 3,11,20-triketo-17α-hydroxy-21-acetoxy-pregnane used in those procedures, 9α-fluoro-3,11,20-triketo-17α-hydroxy-21-acetoxy pregnane.

Various changes and modifications may be made in carrying out the present invention without departing from the spirit and scope thereof. Insofar as these changes and modifications are within the purview of the annexed claims, they are to be considered as part of this invention.

I claim:

1. A compound having the following formula:

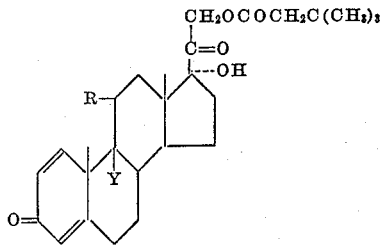

wherein R is a radical selected from the group consisting of keto and hydroxy radicals, and Y is a substituent selected from the group consisting of hydrogen and fluoro substituents.

2. Δ$^{1,4}$-3,11,20-triketo-17α,21-dihydroxy-pregnadiene 21-tertiary butyl-acetate.

3. Δ$^{1,4}$-3,20-diketo-11β,17α,21-trihydroxy-pregnadiene 21-tertiary butyl-acetate.

4. Δ$^{1,4}$-9α-fluoro-3,11,20-triketo-17α,21-dihydroxy-pregnadiene 21-tertiary butyl-acetate.

5. Δ$^{1,4}$-9α-fluoro-3,20-diketo-11β,17α,21-trihydroxy-pregnadiene 21-tertiary butyl-acetate.

6. A composition consisting of a suspension of Δ$^{1,4}$-3,20-diketo-11β,17α,21-trihydroxy-pregnadiene 21-tertiary butyl-acetate in an aqueous pharmaceutical carrier.

7. The process which comprises reacting a compound having the following formula:

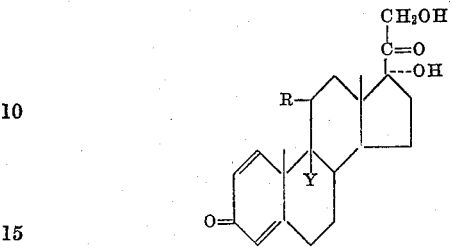

wherein R is a radical selected from the group consisting of keto and hydroxy radicals, and Y is a substituent selected from the group consisting of hydrogen and fluoro substituents, with tertiary butyl-acetyl chloride in the presence of a base to produce a compound having the formula:

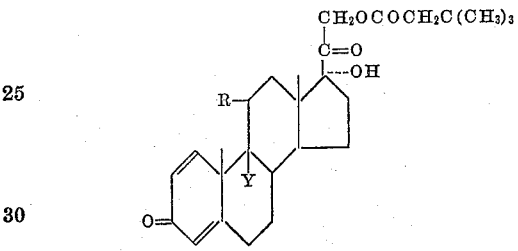

wherein R and Y have the significance above-defined.

8. The process which comprises reacting Δ$^{1,4}$-3,11,20-triketo-17α,21-dihydroxy-pregnadiene with tertiary butyl-acetyl chloride in the presence of pyridine to produce Δ$^{1,4}$-3,11,20-triketo-17α,21-dihydroxy-pregnadiene 21-tertiary butyl-acetate.

9. The process which comprises reacting Δ$^{1,4}$-3,20-diketo-11β,17α,21-trihydroxy-pregnadiene with tertiary butyl-acetyl chloride in the presence of pyridine to produce Δ$^{1,4}$-3,20-diketo-11β,17α,21-trihydroxy-pregnadiene 21-tertiary butyl-acetate.

10. The process which comprises reacting Δ$^{1,4}$-9α-fluoro-3,11,20-triketo-17α,21-dihydroxy-pregnadiene with tertiary butyl-acetyl chloride in the presence of pyridine to produce Δ$^{1,4}$-9α-fluoro-3,11,20-triketo-17α,21-dihydroxy-pregnadiene 21-tertiary butyl-acetate.

11. The process which comprises reacting Δ$^{1,4}$-9α-fluoro-3,20-diketo-11β,17α,21-trihydroxy-pregnadiene with tertiary butyl-acetyl chloride in the presence of pyridine to produce Δ$^{1,4}$-9α-fluoro-3,20-diketo-11β,17α,21-trihydroxy-pregnadiene 21-tertiary butyl-acetate.

References Cited in the file of this patent

UNITED STATES PATENTS

| | | |
|---|---|---|
| 2,183,589 | Reichstein | Dec. 19, 1939 |
| 2,579,479 | Djerassi | Dec. 25, 1951 |
| 2,673,863 | Miescher | Mar. 30, 1954 |